Aug. 15, 1950 A. A. REILLY 2,518,998
HEAT INDICATOR AND SWITCH
Filed Feb. 17, 1947

INVENTOR.
ARLINGTON A. REILLY
BY
*[signature]*
ATTORNEY

Patented Aug. 15, 1950

2,518,998

UNITED STATES PATENT OFFICE 2,518,998

HEAT INDICATOR AND SWITCH

Arlington A. Reilly, Brooklyn, N. Y.

Application February 17, 1947, Serial No. 729,051

1 Claim. (Cl. 200—56)

The present invention relates to a heat indicator and automatic shut-off for electric appliances and it consists in the combinations, constructions and arrangements of parts herein described and claimed.

An object of the invention is the provision of means for the control of heat exchanging apparatus such as heating plants or air conditioning apparatus.

A further object of the invention is the provision of means, subject to temperatures existing both indoors and out-of-doors for controlling the operation of heat exchanging apparatus.

Another object of the invention is the provision of apparatus of this type which is simple in its construction, inexpensive to manufacture and easily operated.

Another object of the invention is the provision of unitary and compact housings for the various elements of the apparatus.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Figures 1, 3:
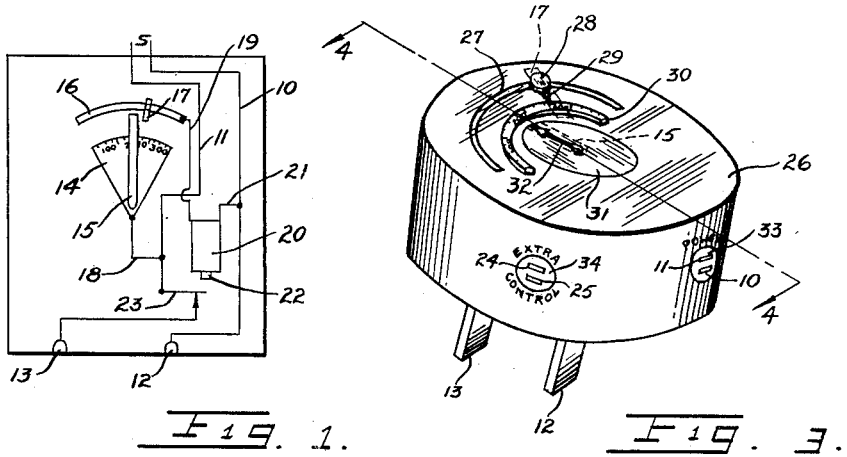
Fig. 1 is a diagrammatic view of an embodiment of the invention.
Fig. 3 is a perspective view of a unitary housing utilized in carrying out the invention.

Referring more particularly to the drawings, there is shown therein, in Fig. 1, an apparatus for the control of a heat exchange apparatus where it is desirable to cut off the supply of electricity reaching the appliance when the temperature in the room has reached a certain temperature.

In carrying out the invention, there is shown at S a source of electrical supply adapted normally to complete a circuit through conductors 10 and 11 to terminals 12 and 13 to which may be connected an electric room heater or similar appliance. A temperature controlled indicator 14 is supplied with an indicating arm 15 adapted to move in accordance with the temperature and an arcuate plate 16 is mounted thereover. The plate 16 has slidably mounted thereon a movable contact 17 adapted to make contact with the free end of the indicating arm 15 when a certain temperature is reached, it being understood that the contact 17 may be manually adjusted with relation to the plate 16.

When the arm 15 does so electrically connect with the contact 17, a circuit is completed through the conductors 11, 18 and 19, the electromagnet 20, the conductor 21 and conductor 10, thereby energizing the magnet and causing the core 22 thereof to exert a force upon the switch 23 to open the circuit including the electric heater or other appliance it is desired to regulate.

Figure 2:
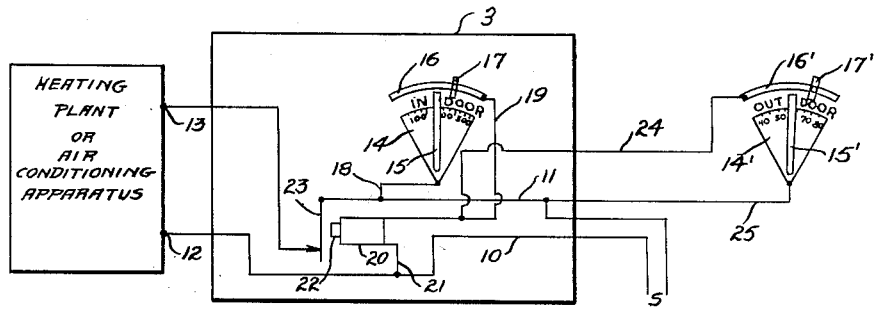
Fig. 2 is a view similar to Fig. 1 showing another embodiment of the invention.
Figure 4:
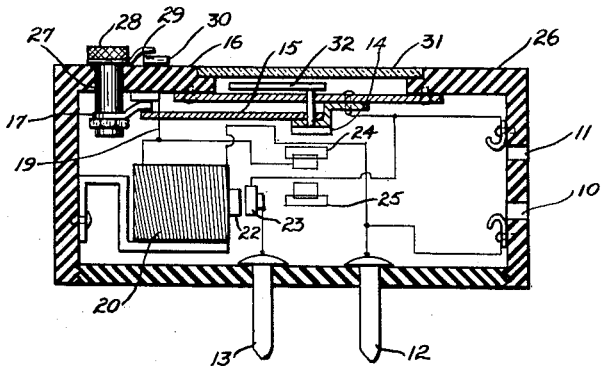
Fig. 4 is a sectional view taken substantially along line 4—4 of Fig. 3.

Referring to the apparatus shown in Figs. 2 to 4, wherein parts similar to those shown in Fig. 1 are given identical reference characters. The apparatus of this form of the invention is designed for controlling the operation of a heating apparatus or air-conditioning apparatus. It will be apparent that the apparatus has all of the parts shown in Fig. 1 plus the addition of a secondary heat controlled circuit maker and breaker which has been given primed reference characters similar to those applied to the primary device.

The plate 16' is electrically connected by a conductor 24 to the conductor 19 and the indicating arm 15' is electrically connected by means of a conductor 25 to the conductor 11.

In the operation of the apparatus shown in Fig. 2, it will be apparent that a dual regulation of a heat exchanging apparatus such as a heating plant, air conditioning apparatus or the like may be effected.

For example, the contact 17 may be set for a given temperature indoors and the contact 17' set for a certain out-of-doors temperature. So long as these temperatures have not been reached, it will be apparent that there is a closed circuit from the source of power indicated at S through the conductors 10 and 11. When, however, the indicating arm 15 reaches the contact 17 due to the indoor temperature reaching the predetermined figure, a circuit is completed through conductors 18 and 11, the source of power, conductors 10 and 21 and the electromagnet 20, causing the core 22 to exert a force upon the switch 23, thereby opening the circuit to the heat exchanging apparatus.

Likewise, if the outside temperature should reach a predetermined point, a circuit will be completed through conductor 24, electromagnet 20, conductors 21 and 10, the source of power and conductor 25, thereby causing a like opening of the circuit to the heat exchanging apparatus.

Thus such heat exchanging apparatus may be controlled with respect to both indoor and out-ofdoor temperatures and, furthermore, will doubly ensure the closing of the circuit to the heat exchanging apparatus when certain predetermined temperatures have been reached.

Referring to Figs. 3 and 4, it will be seen that a unitary housing has been provided for the apparatus disclosed in that portion of Fig. 2 encompassed by the rectangle 3 which consists of a casing 26 of insulation material and of generally cylindrical shape having an arcuate slot 27 through which protrudes an operating handle 28, which is attached at its inner end to the contact 17. The handle is equipped with a pointer 29 adapted to overlie an arcuate shaped indicia bearing band 30. There is also provided a centrally located window 31 through which may be viewed a temperature indicating pointer 32 which has affixed at its under side the indicating arm 15. There is provided a socket 33 for the reception of a connection from the source of power and a socket 34 for the reception of leads from the secondary circuit maker and breaker shown with primed reference characters in Fig. 2.

It will be understood that housings exactly similar to that shown in Fig. 3 will be provided for the secondary circuit maker and breaker and for the structure disclosed in Fig. 1 with the exception that in the two latter cases, one of the sockets 33 and 34 may be omitted as unnecessary.

It is to be understood that instead of the extending terminals 12 and 13, socket or plug opening may be provided in the device.

Details of the temperature responsive indicators 14 and 14' are not given in the present disclosure as such devices are generally known and form no part of the present invention.

While I have illustrated and described the preferred embodiments of my invention, it is to be understood that I do not limit myself to the precise construction herein disclosed and the right is reserved to all changes and modifications coming within the scope of the invention as defined in the appended claim.

Having thus described my invention, what I claim as new, and desire to secure by United States Letters Patent is:

In a device to be connected in an electrical circuit for controlling the operation of a heating apparatus or an air conditioning apparatus, a cylindrical casing of insulation material having a flat top wall formed with a centrally located circular opening, a plate secured to the inside face of said top wall over said opening closing the same, said top wall being formed with an arcuate slot to one side of said opening and concentric therewith, an arcuately shaped indicia bearing band mounted on said top face between said opening and said arcuate slot and concentric therewith, a pin rotatively mounted through said plate concentric with said band, a radial arm fixedly mounted on the inner end of said pin and connected with a lead of the electrical circuit, an operating handle slidably mounted through said slot and manually movable to desired adjusted positions along the length of said slot, a contact mounted on the inner end of said handle and connected with another lead of the electrical circuit and projected into the path traversed by the free end of said radial arm in all of the adjusted positions of said handle along said slot to be engaged by said arm to close the circuit, an indicating pointer on the outer end of said pin registering with the side of said band adjacent said opening to indicate the turned position of said radial arm, a pointer projecting radially from the outer end of said operating handle registering with the side of said band adjacent said arcuate slot, and a transparent member closing the top of said opening and enclosing said first-mentioned pointer and through which said indicating pointer may be viewed.

ARLINGTON A. REILLY.

REFERENCES CITED

The following references are of record in the file of this patent:

UNITED STATES PATENTS

| Number | Name | Date |
|---|---|---|
| 788,166 | Newton | Apr. 25, 1905 |
| 985,943 | Sachs | Mar. 17, 1911 |
| 1,283,660 | Camp | Nov. 5, 1918 |
| 1,297,326 | Dahl et al. | Mar. 18, 1919 |
| 1,374,935 | McGogy | Apr. 19, 1921 |
| 1,770,715 | Stavracos | July 15, 1930 |
| 2,012,210 | Williams | Aug. 20, 1935 |